United States Patent
Foster et al.

(10) Patent No.: US 8,170,762 B2
(45) Date of Patent: May 1, 2012

(54) METHOD AND APPARATUS TO CONTROL OPERATION OF A HYDRAULIC PUMP FOR AN ELECTRO-MECHANICAL TRANSMISSION

(75) Inventors: Michael D. Foster, Carmel, IN (US); Eric S. Tryon, Indianapolis, IN (US); Jy-Jen F. Sah, West Bloomfield, MI (US); Ali K Naqvi, White Lake, MI (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesellschaft, Munich (DE)

(*) Notice: Subject to any disclaimer, the term of this patent is extended or adjusted under 35 U.S.C. 154(b) by 855 days.

(21) Appl. No.: 12/250,296

(22) Filed: Oct. 13, 2008

(65) Prior Publication Data
US 2009/0112423 A1   Apr. 30, 2009

Related U.S. Application Data

(60) Provisional application No. 60/983,273, filed on Oct. 29, 2007.

(51) Int. Cl.
*F04B 49/00*   (2006.01)

(52) U.S. Cl. ............... 701/60; 477/36; 477/45; 477/50; 477/69; 477/73; 701/56; 701/65; 701/99; 701/100; 701/112; 701/29.1; 701/36; 701/50; 701/51; 701/53; 180/120; 180/65.1; 180/65.265; 180/65.275; 180/337; 180/338; 475/1; 475/31; 475/32; 475/72; 475/161; 417/1; 417/2; 417/3; 417/13

(58) Field of Classification Search ................ None
See application file for complete search history.

(56) References Cited

U.S. PATENT DOCUMENTS

| | | | | |
|---|---|---|---|---|
| 5,074,167 | A * | 12/1991 | Yoshimura et al. | 477/161 |
| 5,093,789 | A * | 3/1992 | Yoshimura et al. | 701/58 |
| 6,022,293 | A * | 2/2000 | Dourra et al. | 477/158 |
| 6,514,175 | B2 * | 2/2003 | Taniguchi et al. | 477/156 |
| 6,730,000 | B1 * | 5/2004 | Leising et al. | 477/110 |
| 6,832,148 | B1 | 12/2004 | Bennett | |
| 6,832,977 | B2 * | 12/2004 | You | 477/161 |
| 6,868,318 | B1 | 3/2005 | Cawthorne | |
| 6,991,581 | B2 * | 1/2006 | Murakami et al. | 477/3 |
| 7,073,328 | B2 * | 7/2006 | Knoblauch | 60/368 |
| 7,082,918 | B2 * | 8/2006 | Rozario et al. | 123/196 R |
| 7,154,236 | B1 | 12/2006 | Heap | |
| 7,164,981 | B2 * | 1/2007 | Kim | 701/51 |
| 7,985,154 | B2 * | 7/2011 | Day et al. | 475/159 |
| 8,060,267 | B2 * | 11/2011 | Tamai et al. | 701/22 |
| 8,062,174 | B2 * | 11/2011 | Sah et al. | 477/15 |
| 8,067,908 | B2 * | 11/2011 | Heap et al. | 318/139 |
| 8,068,966 | B2 * | 11/2011 | Wu et al. | 701/60 |
| 8,070,647 | B2 * | 12/2011 | Heap | 477/3 |
| 8,073,601 | B2 * | 12/2011 | Heap et al. | 701/54 |

(Continued)

*Primary Examiner* — Jonathan M Dager

(57) ABSTRACT

A method for controlling a hydraulic flow within a powertrain comprising an electromechanical transmission mechanically-operatively coupled to an engine adapted to selectively transmit power to an output, wherein the transmission utilizes a hydraulic control system serving a number of hydraulic oil consuming functions includes monitoring minimum hydraulic pressure requirements for each of the functions, determining a requested hydraulic pressure based upon the monitoring minimum hydraulic pressure requirements and physical limits of the hydraulic control system including a maximum pressure, determining a desired flow utilizing a hydraulic control system flow model based upon the requested hydraulic pressure, and utilizing the desired flow to control an auxiliary hydraulic pump.

17 Claims, 6 Drawing Sheets

U.S. PATENT DOCUMENTS

| | | | |
|---|---|---|---|
| 8,073,602 B2 * | 12/2011 | Hsieh et al. | 701/54 |
| 2004/0007405 A1 * | 1/2004 | Noda et al. | 180/65.4 |
| 2004/0063539 A1 * | 4/2004 | Endo et al. | 477/45 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0101433 A1 * | 5/2005 | Joe | 477/5 |
| 2005/0166586 A1 * | 8/2005 | Lippert et al. | 60/428 |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |
| 2005/0255966 A1 | 11/2005 | Tao | |
| 2005/0255967 A1 | 11/2005 | Foster | |
| 2005/0255968 A1 | 11/2005 | Sah | |
| 2005/0256617 A1 | 11/2005 | Cawthorne | |
| 2005/0256618 A1 | 11/2005 | Hsieh | |
| 2005/0256623 A1 * | 11/2005 | Hubbard et al. | 701/54 |
| 2005/0256625 A1 | 11/2005 | Sah | |
| 2005/0256626 A1 | 11/2005 | Hsieh | |
| 2005/0256627 A1 | 11/2005 | Sah | |
| 2005/0256629 A1 | 11/2005 | Tao | |
| 2005/0256631 A1 | 11/2005 | Cawthorne | |
| 2005/0256633 A1 | 11/2005 | Heap | |
| 2005/0256919 A1 | 11/2005 | Cawthorne | |
| 2006/0194670 A1 | 8/2006 | Heap | |
| 2007/0078580 A1 | 4/2007 | Cawthorne | |
| 2007/0093953 A1 | 4/2007 | Heap | |
| 2007/0149348 A1 | 6/2007 | Holmes | |
| 2007/0191181 A1 | 8/2007 | Burns | |
| 2007/0225886 A1 | 9/2007 | Morris | |
| 2007/0225887 A1 | 9/2007 | Morris | |
| 2007/0225888 A1 | 9/2007 | Morris | |
| 2007/0225889 A1 | 9/2007 | Morris | |
| 2007/0260381 A1 | 11/2007 | Sah | |
| 2007/0276569 A1 | 11/2007 | Sah | |
| 2007/0284162 A1 | 12/2007 | Zettel | |
| 2007/0284163 A1 | 12/2007 | Heap | |
| 2007/0284176 A1 | 12/2007 | Sah | |
| 2007/0285059 A1 | 12/2007 | Zettel | |
| 2007/0285060 A1 | 12/2007 | Zettel | |
| 2007/0285061 A1 | 12/2007 | Zettel | |
| 2007/0285063 A1 | 12/2007 | Zettel | |
| 2007/0285097 A1 | 12/2007 | Zettel | |
| 2008/0004779 A1 | 1/2008 | Sah | |
| 2008/0028879 A1 | 2/2008 | Robinette | |
| 2008/0032855 A1 | 2/2008 | Sah | |
| 2008/0064559 A1 | 3/2008 | Cawthorne | |
| 2008/0064562 A1 | 3/2008 | Aettel | |
| 2008/0103003 A1 | 5/2008 | Sah | |
| 2008/0119320 A1 | 5/2008 | Wu | |
| 2008/0119321 A1 | 5/2008 | Heap | |
| 2008/0120000 A1 | 5/2008 | Heap | |
| 2008/0120001 A1 | 5/2008 | Heap | |
| 2008/0120002 A1 | 5/2008 | Heap | |
| 2008/0176706 A1 | 7/2008 | Wu | |
| 2008/0176709 A1 | 7/2008 | Wu | |
| 2008/0181280 A1 | 7/2008 | Wang | |
| 2008/0182696 A1 | 7/2008 | Sah | |
| 2008/0183372 A1 | 7/2008 | Snyder | |
| 2008/0234097 A1 | 9/2008 | Sah | |
| 2008/0236921 A1 | 10/2008 | Huseman | |
| 2008/0243346 A1 | 10/2008 | Huseman | |
| 2008/0249745 A1 | 10/2008 | Heap | |
| 2008/0262694 A1 | 10/2008 | Heap | |
| 2008/0262698 A1 | 10/2008 | Lahti | |
| 2008/0272717 A1 | 11/2008 | Gleason | |
| 2008/0275611 A1 | 11/2008 | Snyder | |
| 2008/0275624 A1 | 11/2008 | Snyder | |
| 2008/0275625 A1 | 11/2008 | Snyder | |
| 2008/0287255 A1 | 11/2008 | Snyder | |
| 2009/0069148 A1 | 3/2009 | Heap | |
| 2009/0069989 A1 | 3/2009 | Heap | |
| 2009/0070019 A1 | 3/2009 | Heap | |
| 2009/0082170 A1 | 3/2009 | Heap | |
| 2009/0088294 A1 | 4/2009 | West | |
| 2009/0105039 A1 | 4/2009 | Sah | |
| 2009/0105896 A1 | 4/2009 | Tamai | |
| 2009/0105898 A1 | 4/2009 | Wu | |
| 2009/0105914 A1 | 4/2009 | Buur | |
| 2009/0107745 A1 | 4/2009 | Buur | |
| 2009/0107755 A1 | 4/2009 | Kothari | |
| 2009/0108673 A1 | 4/2009 | Wang | |
| 2009/0111637 A1 | 4/2009 | Day | |
| 2009/0111640 A1 | 4/2009 | Buur | |
| 2009/0111642 A1 | 4/2009 | Sah | |
| 2009/0111643 A1 * | 4/2009 | Sah et al. | 477/5 |
| 2009/0111644 A1 * | 4/2009 | Kaminsky et al. | 477/5 |
| 2009/0111645 A1 | 4/2009 | Heap | |
| 2009/0112385 A1 | 4/2009 | Heap | |
| 2009/0112392 A1 | 4/2009 | Buur | |
| 2009/0112399 A1 | 4/2009 | Buur | |
| 2009/0112412 A1 | 4/2009 | Cawthorne | |
| 2009/0112416 A1 | 4/2009 | Heap | |
| 2009/0112417 A1 | 4/2009 | Kaminsky | |
| 2009/0112418 A1 | 4/2009 | Buur | |
| 2009/0112419 A1 | 4/2009 | Heap | |
| 2009/0112420 A1 | 4/2009 | Buur | |
| 2009/0112421 A1 * | 4/2009 | Sah et al. | 701/59 |
| 2009/0112422 A1 | 4/2009 | Sah | |
| 2009/0112427 A1 | 4/2009 | Heap | |
| 2009/0112428 A1 | 4/2009 | Sah | |
| 2009/0112429 A1 | 4/2009 | Sah | |
| 2009/0112495 A1 | 4/2009 | Center | |
| 2009/0115349 A1 | 5/2009 | Heap | |
| 2009/0115350 A1 | 5/2009 | Heap | |
| 2009/0115351 A1 | 5/2009 | Heap | |
| 2009/0115352 A1 | 5/2009 | Heap | |
| 2009/0115353 A1 | 5/2009 | Heap | |
| 2009/0115354 A1 | 5/2009 | Heap | |
| 2009/0115365 A1 | 5/2009 | Heap | |
| 2009/0115373 A1 | 5/2009 | Kokotovich | |
| 2009/0115377 A1 | 5/2009 | Schwenke | |
| 2009/0115408 A1 | 5/2009 | West | |
| 2009/0115491 A1 | 5/2009 | Anwar | |
| 2009/0118074 A1 | 5/2009 | Zettel | |
| 2009/0118075 A1 | 5/2009 | Heap | |
| 2009/0118076 A1 | 5/2009 | Heap | |
| 2009/0118077 A1 | 5/2009 | Hsieh | |
| 2009/0118078 A1 | 5/2009 | Wilmanowicz | |
| 2009/0118079 A1 | 5/2009 | Heap | |
| 2009/0118080 A1 | 5/2009 | Heap | |
| 2009/0118081 A1 | 5/2009 | Heap | |
| 2009/0118082 A1 | 5/2009 | Heap | |
| 2009/0118083 A1 * | 5/2009 | Kaminsky et al. | 477/5 |
| 2009/0118084 A1 | 5/2009 | Heap | |
| 2009/0118085 A1 | 5/2009 | Heap | |
| 2009/0118086 A1 | 5/2009 | Heap | |
| 2009/0118087 A1 | 5/2009 | Hsieh | |
| 2009/0118089 A1 | 5/2009 | Heap | |
| 2009/0118090 A1 | 5/2009 | Heap | |
| 2009/0118091 A1 | 5/2009 | Lahti | |
| 2009/0118093 A1 | 5/2009 | Heap | |
| 2009/0118094 A1 | 5/2009 | Hsieh | |
| 2009/0118877 A1 | 5/2009 | Center | |
| 2009/0118879 A1 | 5/2009 | Heap | |
| 2009/0118880 A1 | 5/2009 | Heap | |
| 2009/0118882 A1 | 5/2009 | Heap | |
| 2009/0118883 A1 | 5/2009 | Heap | |
| 2009/0118884 A1 | 5/2009 | Heap | |
| 2009/0118885 A1 | 5/2009 | Heap | |
| 2009/0118886 A1 | 5/2009 | Tamai | |

| | | | | | | |
|---|---|---|---|---|---|---|
| 2009/0118887 A1 | 5/2009 | Minarcin | | 2009/0118938 A1 | 5/2009 | Heap |
| 2009/0118888 A1 | 5/2009 | Minarcin | | 2009/0118939 A1 | 5/2009 | Heap |
| 2009/0118901 A1 | 5/2009 | Cawthorne | | 2009/0118940 A1 | 5/2009 | Heap |
| 2009/0118914 A1 | 5/2009 | Schwenke | | 2009/0118941 A1 | 5/2009 | Heap |
| 2009/0118915 A1 | 5/2009 | Heap | | 2009/0118942 A1 | 5/2009 | Hsieh |
| 2009/0118916 A1 | 5/2009 | Kothari | | 2009/0118943 A1 | 5/2009 | Heap |
| 2009/0118917 A1 | 5/2009 | Sah | | 2009/0118944 A1 | 5/2009 | Heap |
| 2009/0118918 A1 | 5/2009 | Heap | | 2009/0118945 A1 | 5/2009 | Heap |
| 2009/0118919 A1 | 5/2009 | Heap | | 2009/0118946 A1 | 5/2009 | Heap |
| 2009/0118920 A1 | 5/2009 | Heap | | 2009/0118947 A1 | 5/2009 | Heap |
| 2009/0118921 A1 | 5/2009 | Heap | | 2009/0118948 A1 | 5/2009 | Heap |
| 2009/0118922 A1 | 5/2009 | Heap | | 2009/0118949 A1 | 5/2009 | Heap |
| 2009/0118923 A1 | 5/2009 | Heap | | 2009/0118950 A1 | 5/2009 | Heap |
| 2009/0118924 A1 | 5/2009 | Heap et al. | | 2009/0118951 A1 | 5/2009 | Heap |
| 2009/0118925 A1 | 5/2009 | Hsieh | | 2009/0118952 A1 | 5/2009 | Heap |
| 2009/0118926 A1 | 5/2009 | Heap | | 2009/0118954 A1 | 5/2009 | Wu |
| 2009/0118927 A1 | 5/2009 | Heap | | 2009/0118957 A1 | 5/2009 | Heap |
| 2009/0118928 A1 | 5/2009 | Heap | | 2009/0118962 A1 | 5/2009 | Heap |
| 2009/0118929 A1 | 5/2009 | Heap | | 2009/0118963 A1 | 5/2009 | Heap |
| 2009/0118930 A1 | 5/2009 | Heap | | 2009/0118964 A1 | 5/2009 | Snyder |
| 2009/0118931 A1 | 5/2009 | Kaminsky | | 2009/0118969 A1 | 5/2009 | Heap |
| 2009/0118932 A1 | 5/2009 | Heap | | 2009/0118971 A1 | 5/2009 | Heap |
| 2009/0118933 A1 | 5/2009 | Heap | | 2009/0118999 A1 | 5/2009 | Heap |
| 2009/0118934 A1 | 5/2009 | Heap | | 2009/0144002 A1 | 6/2009 | Zettel |
| 2009/0118935 A1 | 5/2009 | Heap | | 2009/0247355 A1 * | 10/2009 | Tryon et al. .............. 477/52 |
| 2009/0118936 A1 | 5/2009 | Heap | | | | |
| 2009/0118937 A1 | 5/2009 | Heap | | | | |

\* cited by examiner

METHOD AND APPARATUS TO CONTROL OPERATION OF A HYDRAULIC PUMP FOR AN ELECTRO-MECHANICAL TRANSMISSION

CROSS REFERENCE TO RELATED APPLICATIONS

This application claims the benefit of U.S. Provisional Application No. 60/983,273 filed on Oct. 29, 2007 which is hereby incorporated herein by reference.

TECHNICAL FIELD

This disclosure pertains to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed. A hydraulic control system is known to provide pressurized hydraulic oil for a number of functions throughout the powertrain.

Operation of the above devices within a hybrid powertrain vehicle require management of numerous torque bearing shafts or devices representing connections to the above mentioned engine, electrical machines, and driveline. Input torque from the engine and input torque from the electric machine or electric machines can be applied individually or cooperatively to provide output torque. Various control schemes and operational connections between the various aforementioned components of the hybrid drive system are known, and the control system must be able to engage to and disengage the various components from the transmission in order to perform the functions of the hybrid powertrain system. Engagement and disengagement are known to be accomplished within the transmission by employing selectively operable clutches.

Clutches are devices well known in the art for engaging and disengaging shafts including the management of rotational velocity and torque differences between the shafts. Clutches are known in a variety of designs and control methods. One known type of clutch is a mechanical clutch operating by separating or joining two connective surfaces, for instance, clutch plates, operating, when joined, to apply frictional torque to each other. One control method for operating such a mechanical clutch includes applying the hydraulic control system implementing fluidic pressures transmitted through hydraulic lines to exert or release clamping force between the two connective surfaces. Operated thusly, the clutch is not operated in a binary manner, but rather is capable of a range of engagement states, from fully disengaged, to synchronized but not engaged, to engaged but with only minimal clamping force, to engaged with some maximum clamping force. The clamping force available to be applied to the clutch determines how much reactive torque the clutch can carry before the clutch slips.

The hydraulic control system, as described above, utilizes lines charged with hydraulic oil to selectively activate clutches within the transmission. However, the hydraulic control system is also known to perform a number of other functions in a hybrid powertrain. For example, an electric machine utilized within a hybrid powertrain generates heat. Known embodiments utilize hydraulic oil from the hydraulic control system in a continuous flow to cool the electric machine in a base machine cooling function. Other known embodiments additionally are known to react to higher electric machine temperatures with a selectable or temperature driven active machine cooling function, providing additional cooling in the high temperature condition. Additionally, known embodiments utilize hydraulic oil to lubricate mechanical devices, such as bearings. Also, hydraulic circuits are known to include some level of internal leakage.

Hydraulic oil is known to be pressurized within a hydraulic control system with a pump. The pump can be electrically powered or preferably mechanically driven. In addition to this first main hydraulic pump, hydraulic control systems are known to also include an auxiliary hydraulic pump. The internal impelling mechanism operates at some speed, drawing hydraulic oil from a return line and pressurizing the hydraulic control system. The supply of hydraulic flow by the pump or pumps is affected by the speed of the pumps, the back pressure exerted by the hydraulic line pressure ($P_{LINE}$), and the temperature of the hydraulic oil ($T_{OIL}$).

$P_{LINE}$ and a rate of flow to each of the functions served by the hydraulic control system are variables dependent upon each other. The rate of hydraulic flow to functions served by the hydraulic control system is function of $P_{LINE}$. One having ordinary skill in the art will appreciate that hydraulic flow through a flow path with given resistance is proportional to the pressure difference across flow path. Conversely, as one having ordinary skill in the art will appreciate, conservation of mass explains that, in steady state, flow entering a system must equal the flow exiting from that system. FIG. 1 schematically illustrates a model of factors impacting hydraulic flow in an exemplary hydraulic control system, in accordance with the present disclosure. Flow enters the hydraulic control system from the operation of a main hydraulic pump and/or an auxiliary hydraulic pump. Flow exits the hydraulic control system through the functions served. In steady state, the flow entering and the flow exiting the hydraulic control system are equal, and $P_{LINE}$ is constant. In non-steady state operation, when flows entering the system are greater than the flows exiting the system, $P_{LINE}$ increases. Similarly, when flows exiting the system are greater than the flows entering the system, $P_{LINE}$ decreases. By monitoring $P_{LINE}$ and modulating the operation of the pump or pumps supplying hydraulic flow to the hydraulic control system, $P_{LINE}$ can be controlled in light of desired line pressures and changing usage of the hydraulic control system.

A number of control schemes have been developed to increase fuel efficiency in an exemplary powertrain utilizing an engine. One exemplary scheme is to operate with an engine stopped when input torque from the engine is not needed. Such a scheme is possible in an exemplary motor vehicle when the vehicle is stopped at a traffic signal or when the vehicle is traveling down an extended decline. Alternatively, in powertrains utilizing a plurality of sources of torque, engine stopped operation is possible when another source of torque is providing for all torque requirements. As noted above, main hydraulic pumps are known to be powered mechanically, driven as a parasitic device from the engine. Hybrid powertrains are known to operate with an engine running or stopped, depending upon the current hybrid control strategy. Under engine stopped operation in a powertrain utilizing a mechanically driven main pump, the main pump cannot provide a supply of hydraulic flow, and, instead, an auxiliary pump must be used to provide $P_{LINE}$ required to operate the vehicle.

A method to accurately control $P_{LINE}$ in a hybrid powertrain through engine running operation, engine stopped operation, and in transition between the two engine states would provide useful control of the hydraulic control system.

SUMMARY

A method for controlling a hydraulic flow within a powertrain comprising an electromechanical transmission mechanically-operatively coupled to an engine adapted to selectively transmit power to an output, wherein the transmission utilizes a hydraulic control system serving a number of hydraulic oil consuming functions includes monitoring minimum hydraulic pressure requirements for each of the functions, determining a requested hydraulic pressure based upon the monitoring minimum hydraulic pressure requirements and physical limits of the hydraulic control system including a maximum pressure, determining a desired flow utilizing a hydraulic control system flow model based upon the requested hydraulic pressure, and utilizing the desired flow to control an auxiliary hydraulic pump.

BRIEF DESCRIPTION OF THE DRAWINGS

One or more embodiments will now be described, by way of example, with reference to the accompanying drawings, in which.

DETAILED DESCRIPTION

Figure 3:
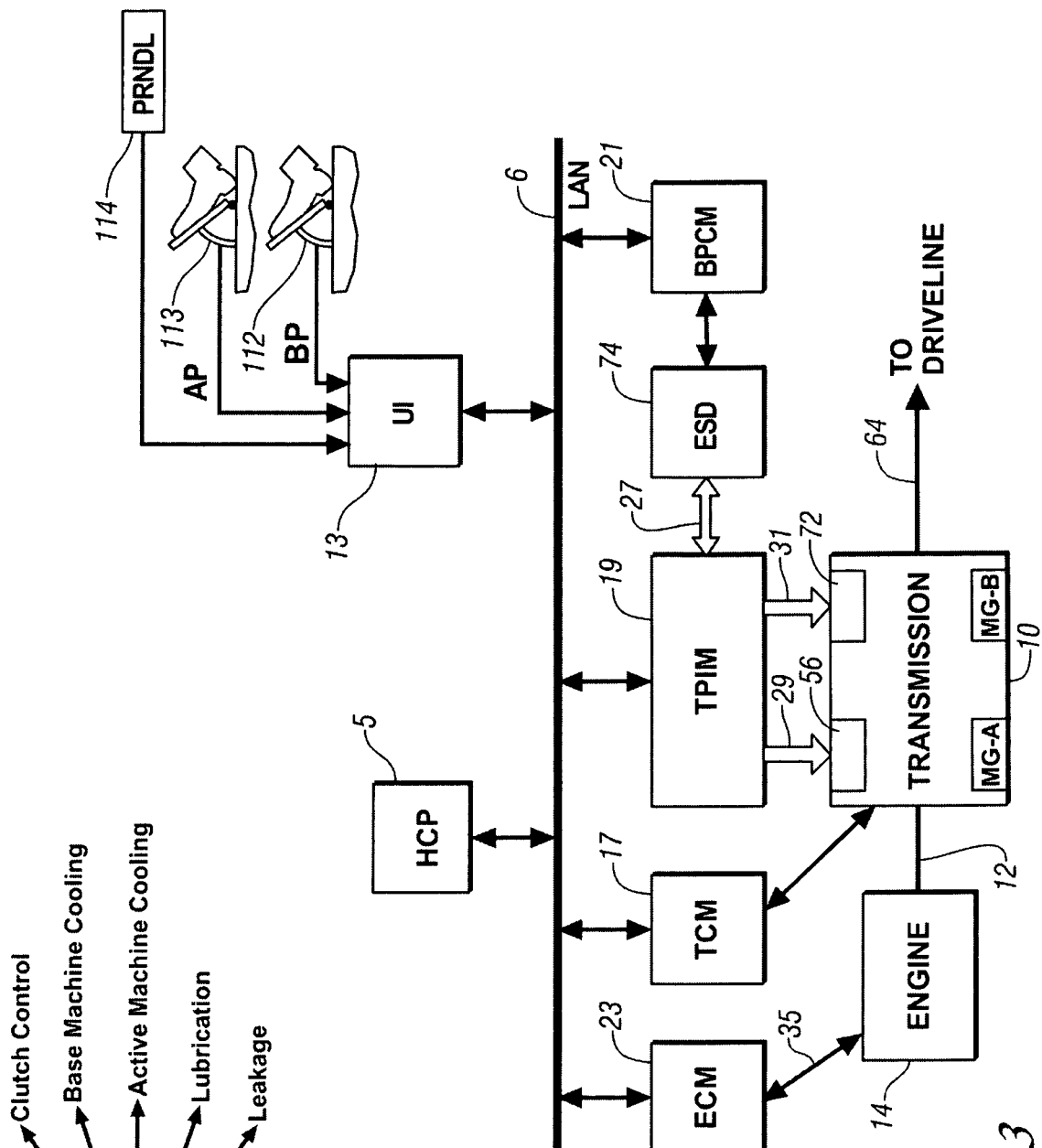
FIG. 3 is a schematic diagram of an exemplary architecture for a control system and powertrain, in accordance with the present disclosure.
Figure 2:
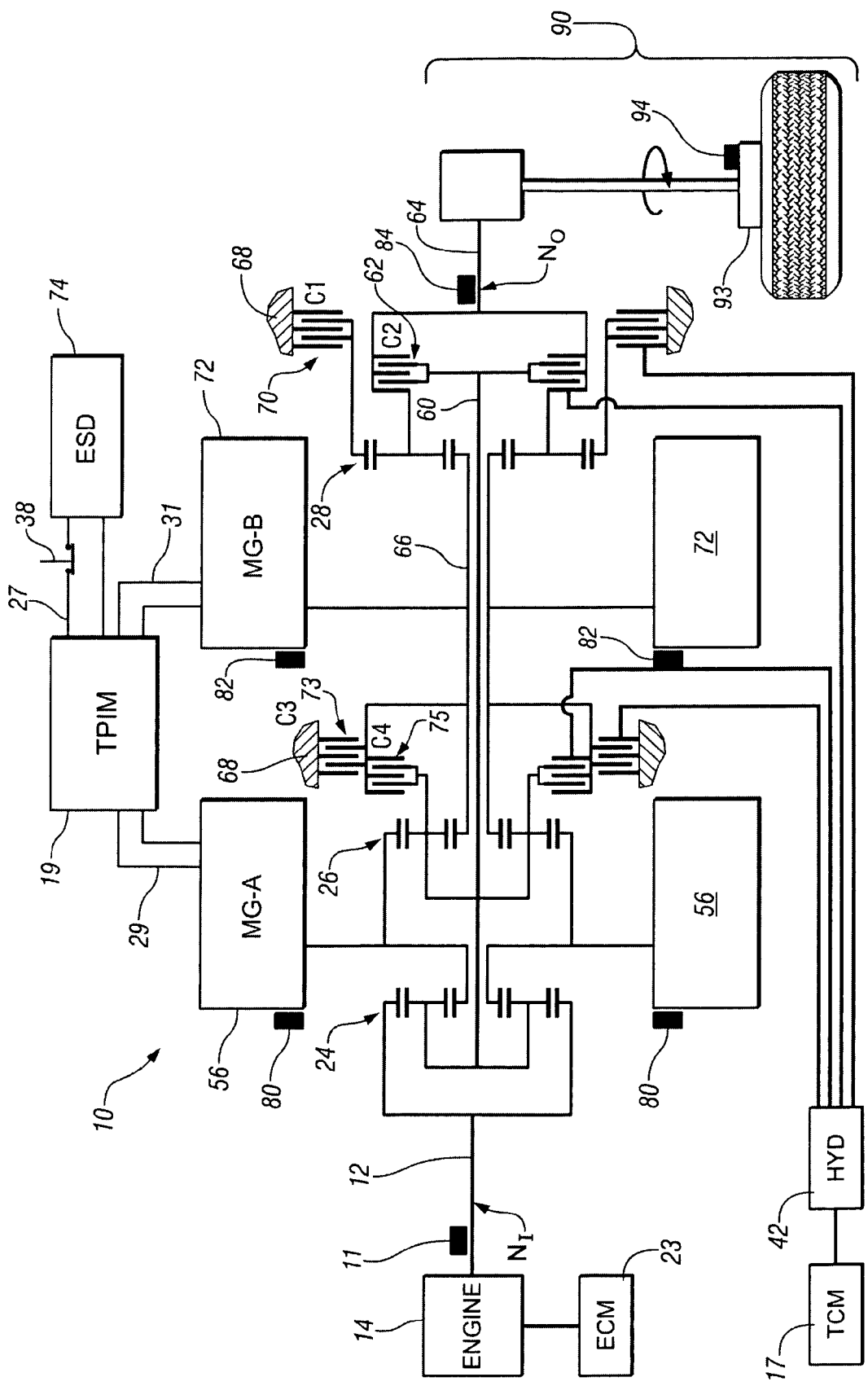
FIG. 2 is a schematic diagram of an exemplary powertrain, in accordance with the present disclosure.

Referring now to the drawings, wherein the showings are for the purpose of illustrating certain exemplary embodiments only and not for the purpose of limiting the same, FIGS. 2 and 3 depict an exemplary electro-mechanical hybrid powertrain. The exemplary electro-mechanical hybrid powertrain in accordance with the present disclosure is depicted in FIG. 2, comprising a two-mode, compound-split, electromechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic oil via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 2. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS\text{-}WHL}$, the output of which is monitored by a control module of a distributed control module system described with respect to FIG. 3, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 3 is a schematic block diagram of the distributed control module system. The elements described hereinafter comprise a subset of an overall vehicle control architecture, and provide coordinated system control of the exemplary powertrain described in FIG. 2. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

Figure 4:
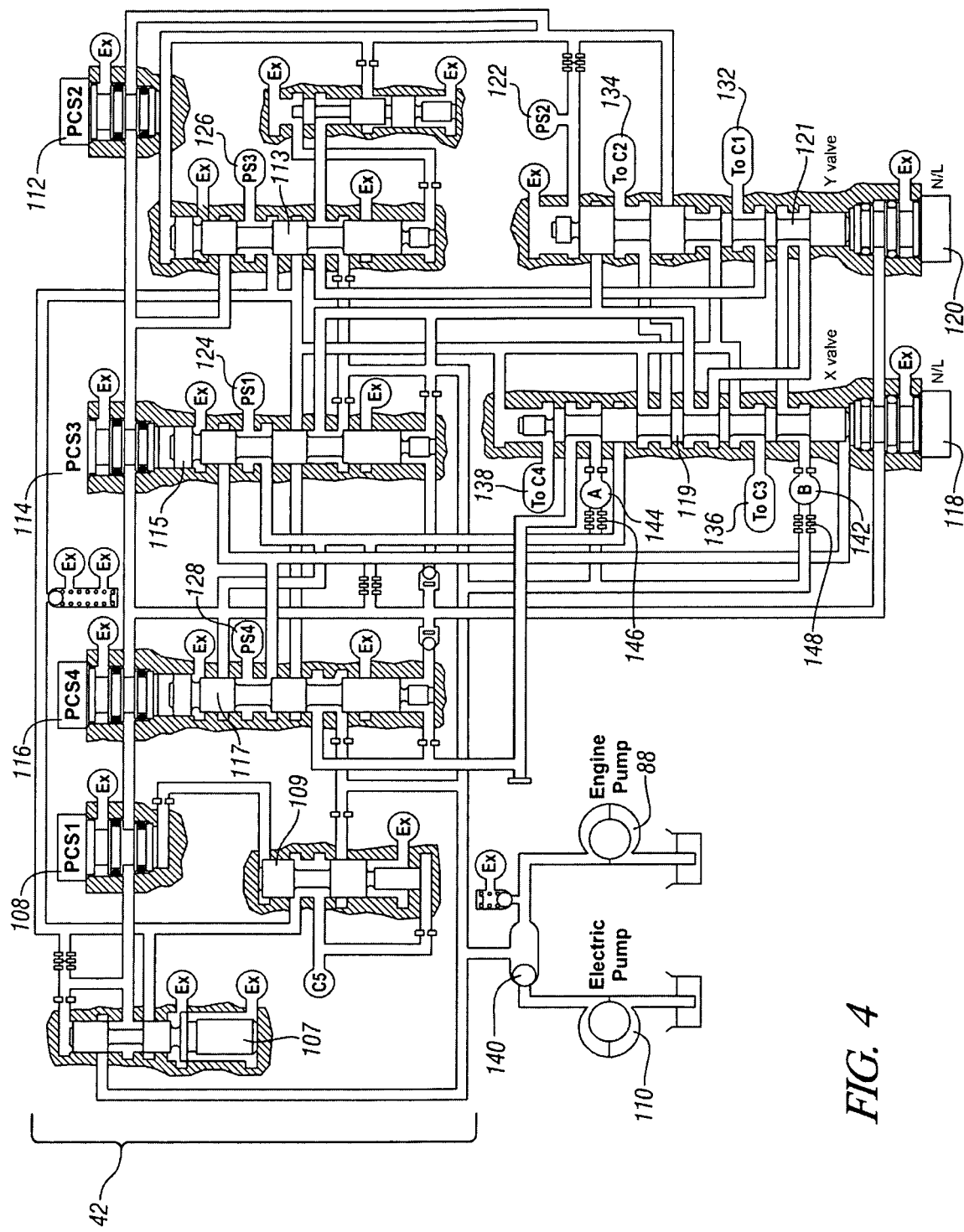
FIG. 4 is a schematic diagram of a hydraulic circuit, in accordance with the present disclosure.

FIG. 4 depicts a schematic diagram of the hydraulic control circuit 42 for controlling flow of hydraulic oil in the exemplary transmission. A main hydraulic pump 88 is driven off the input shaft 12 from the engine 14, and an auxiliary pump 110 controlled by the TPIM 19 to provide pressurized fluid to the hydraulic control circuit 42 through valve 140. The auxiliary pump 110 preferably comprises an electrically-powered pump of an appropriate size and capacity to provide sufficient flow of pressurized hydraulic oil into the hydraulic control circuit 42 when operational. The hydraulic control circuit 42 selectively distributes hydraulic pressure to a plurality of devices, including the torque-transfer clutches C1 70, C2 62, C3 73, and C4 75, active cooling circuits for the first and second electric machines 56 and 72 (not shown), and a base cooling circuit for cooling and lubricating the transmission 10 via passages 142, 144 (not depicted in detail). As previously stated, the TCM 17 actuates the various clutches to achieve one of the transmission operating range states through selective actuation of hydraulic circuit flow control devices comprising variable pressure control solenoids ('PCS') PCS1 108, PCS2 114, PCS3 112, PCS4 116 and solenoid-controlled flow management valves, X-valve 119 and Y-valve 121. The hydraulic control circuit 42 is fluidly connected to pressure switches PS1, PS2, PS3, and PS4 via passages 122, 124, 126, and 128, respectively. The pressure control solenoid PCS1 108 has a control position of normally high and is operative to modulate the magnitude of fluidic pressure in the hydraulic circuit through fluidic interaction with controllable pressure regulator 107 and spool valve 109. The controllable pressure regulator 107 and spool valve 109 interact with PCS1 108 to control hydraulic pressure in the hydraulic control circuit 42 over a range of pressures and may provide additional functionality for the hydraulic control circuit 42. Pressure control solenoid PCS3 112 has a control position of normally high, and is fluidly connected to spool valve 113 and operative to effect flow therethrough when actuated. Spool valve 113 is fluidly connected to pressure switch PS3 via passage 126. Pressure control solenoid PCS2 114 has a control position of normally high, and is fluidly connected to spool valve 115 and operative to effect flow therethrough when actuated. Spool valve 115 is fluidly connected to pressure switch PS2 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High ('1') and Low ('0'). The control states refer to positions of each valve to which control flow to different devices in the hydraulic control circuit 42 and the transmission 10. The X-valve 119 is operative to direct pressurized fluid to clutches C3 73 and C4 75 and cooling systems for stators of the first and second electric machines 56 and 72 via fluidic passages 136, 138, 144, 142 respectively, depending upon the source of the fluidic input, as is described hereinafter. The Y-valve 121 is operative to direct pressurized fluid to clutches C1 70 and C2 62 via fluidic passages 132 and 134 respectively, depending upon the source of the fluidic input, as is described hereinafter. The Y-valve 121 is fluidly connected to pressure switch PS1 via passage 122.

The hydraulic control circuit 42 includes a base cooling circuit for providing hydraulic oil to cool the stators of the first and second electric machines 56 and 72. The base cooling circuit includes fluid conduits from the valve 140 flowing directly to a flow restrictor which leads to fluidic passage 144 leading to the base cooling circuit for the stator of the first electric machine 56, and to a flow restrictor which leads to fluidic passage 142 leading to the base cooling circuit for the stator of the second electric machine 72. Active cooling of stators for the first and second electric machines 56 and 72 is effected by selective actuation of pressure control solenoids PCS2 114, PCS3 112 and PCS4 116 and solenoid-controlled flow management valves X-valve 119 and Y-valve 121, which leads to flow of hydraulic oil around the selected stator and permits heat to be transferred therebetween, primarily through conduction.

An exemplary logic table to accomplish control of the exemplary hydraulic control circuit 42 to control operation of the transmission 10 in one of the transmission operating range states is provided with reference to Table 2, below.

TABLE 2

| Transmission Operating Range State | X-Valve Logic No Latch | Y-Valve Logic C2 Latch | PCS1 Normal High | PCS2 Normal High | PCS3 Normal High | PCS4 Normal Low |
|---|---|---|---|---|---|---|
| EVT Mode I | 0 | 0 | Line Modulation | MG-B Stator Cool | C1 | MG-A Stator Cool |
| EVT Mode II | 0 | 1 | Line Modulation | C2 | MG-B Stator Cool | MG-A Stator Cool |
| Low Range | 1 | 0 | Line Modulation | C2 | C1 | C4 |
| High Range | 1 | 1 | Line Modulation | C2 | C3 | C4 |

A Low Range is defined as a transmission operating range state comprising one of the first continuously variable mode and the first and second fixed gear operations. A High Range is defined as a transmission operating range state comprising one of the second continuously variable mode and the third and fourth fixed gear operations. Selective control of the X-valve 119 and the Y-valve 121 and actuation of the solenoids PCS2 112, PCS3 114, PCS4 116 facilitate flow of hydraulic oil to actuate clutches C1 70, C2 63, C3 73, and C4 75, and provide cooling for the stators the first and second electric machines 56 and 72.

In operation, a transmission operating range state, i.e. one of the fixed gear and continuously variable mode operations, is selected for the exemplary transmission 10 based upon a variety of operating characteristics of the powertrain. This includes the operator torque request, typically communicated through inputs to the UI 13 as previously described. Additionally, a demand for output torque is predicated on external conditions, including, e.g., road grade, road surface conditions, or wind load. The operating range state may be predicated on a powertrain torque demand caused by a control module command to operate of the electrical machines in an electrical energy generating mode or in a torque generating mode. The operating range state can be determined by an optimization algorithm or routine operable to determine an optimum system efficiency based upon the operator torque request, battery state of charge, and energy efficiencies of the engine 14 and the first and second electric machines 56 and 72. The control system manages the input torques from the engine 14 and the first and second electric machines 56 and 72 based upon an outcome of the executed optimization routine, and system optimization occurs to improve fuel economy and manage battery charging. Furthermore, the operation can be determined based upon a fault in a component or system.

As mentioned above, the purpose of the hydraulic control system is to provide pressurized hydraulic oil for a number of functions throughout a hybrid powertrain. One having ordinary skill in the art will appreciate that control of the hydraulic control system in order to enable smooth and consistent operation of the functions served by providing a supply of hydraulic flow requires an understanding of $P_{LINE}$. $P_{LINE}$ is important to understanding the capacity of the hydraulic control system to fill flow requirements to required functions through static and dynamic conditions. $P_{LINE}$ is also important to managing the operation of the pump or pumps utilized to provide the supply of hydraulic flow to the hydraulic control system.

$P_{LINE}$ describes the capacity that the hydraulic control system possesses to fulfill a required function. For instance, in a clutch control function, $P_{LINE}$ describes the maximum clamping force immediately available to the clutch. As described above, the capacity of the clutch to transmit reactive torque depends upon the clamping force applied to the clutch. Additionally, it will be appreciated that $P_{LINE}$ describes how quickly the clutch can be filled. In another example, one having ordinary skill in the art will appreciate that, with regards to electric machine cooling, either serving a base machine cooling function through the electric machine or selectively serving an active machine cooling function, the quantity of hydraulic oil passing through the heat exchange mechanism of the electric machine and the resulting heat exchange capacity of the function rise as a function of $P_{LINE}$. In another example, hydraulic oil can be used to lubricate a device, for instance, a bearing. The resulting flow to the device through a fixed orifice and the resulting ability of the hydraulic flow to meet the lubrication function is a function of $P_{LINE}$.

Figure 1:
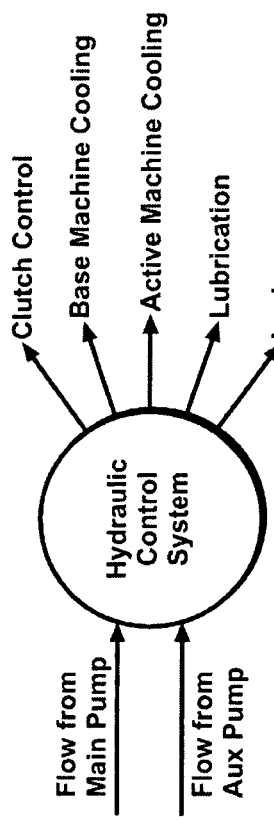
FIG. 1 schematically illustrates a model of factors impacting hydraulic flow in an exemplary hydraulic control system, in accordance with the present disclosure.

Understanding flow consumption by these functions served by the hydraulic control system is important for a number of reasons. As described in these examples and combined with an understanding of the required functions, a minimum $P_{LINE}$ or $P_{MIN}$ can be described for each function describing the line pressure necessary to fulfill the required function for a given set of circumstances. Circumstances affecting $P_{MIN}$ for each function can include $T_{OIL}$, describing the characteristics of the hydraulic oil supplied for the function, and function specific variables describing the function requirements, for instance, a heat rejection rate from the electric machine or an expected change in clutch fill status. In addition, understanding flow consumption by functions served by the hydraulic control system is also important to understanding the $P_{LINE}$ resulting from the aforementioned balance, illustrated in FIG. 1, between the in-flows from the hydraulic pumps and the flow consumption by the functions served.

$P_{MIN}$ for each function served can be used collectively to describe a minimum required $P_{LINE}$ that is required for the hydraulic control system at any point. For example, if an exemplary hydraulic control system serves four hydraulic clutches, a base electric machine cooling circuit, and an active electric machine cooling circuit, the required $P_{LINE}$ at any instant can be described by the maximum of the $P_{MIN}$ values. Alternatively, $P_{MIN}$ values can be predicted for some time period in advance, and $P_{LINE}$ can be set to the maximum $P_{MIN}$ value through that time period. In this way, $P_{MIN}$ values can be used to provide operating requirements to the hydraulic control system.

$P_{LINE}$ is important to managing the supply of hydraulic flow resulting from operation of the pump or pumps utilized to provide the supply of hydraulic flow to the hydraulic control system, describing both an input to the operation of the pumps by describing the back pressure exerted on the pumps and also providing feedback to the operation of the pump or pumps providing a comparison to drive $P_{LINE}$ to a desired line pressure value.

Based upon known conditions and known operation of the pump or pumps, different estimations can be made regarding the capability of the pumps to generate line pressure. For instance, a maximum current line pressure or $P_{MAX}$ can be defined, describing the maximum $P_{LINE}$ that can be generated if the current operational pumps were controlled to their highest flow settings. $P_{MAX}$ can include activating pumps, such an auxiliary pump, not currently active and can also include modulating or restricting functions consuming supply of hydraulic flow from the hydraulic control system. $P_{MAX}$ is useful to supply hydraulic flow to priority functions requiring high $P_{LINE}$ values, for instance, as required to quickly fill a transmission clutch.

As described above, main hydraulic pumps are known to be powered mechanically from the engine. Hybrid powertrains, taking full advantage of fuel efficient operating strategies, are known to operate with an engine running or stopped. Under engine stopped operation in a powertrain utilizing a mechanically driven main pump, the main pump cannot provide a supply of hydraulic flow, and, instead, an auxiliary pump must be used to provide $P_{LINE}$ required for operation of the various functions served by the hydraulic control system. A method to accurately control $P_{LINE}$ in a hybrid powertrain in conjunction with engine running operation, engine stopped operation, and transitions therebetween is provided.

An understanding of $P_{LINE}$ in conjunction with an understanding of functions served by the hydraulic control system allows for determination of a desired line pressure or $P_{DESIRED}$. $P_{DESIRED}$ can include immediate requirements of the hydraulic control system based upon $P_{LINEEST}$, for instance, based upon a projections of $P_{MIN}$ for each function served by the hydraulic control system. Additionally, $P_{DESIRED}$ can include projections of expected requirements, for instance, a projected shift based upon accelerator pedal position or data available from such sources as historical driving patterns or a digital map device or increasing electric machine temperatures expected to soon require active cooling. Values, derivations, and modifying factors for determining $P_{DESIRED}$ may be developed experimentally, empirically, predictively, through modeling or other techniques adequate to accurately predict hydraulic control system operation, and a multitude of criteria for setting $P_{DESIRED}$ might be used by the same engine for each cylinder and for different engine settings, conditions, or operating ranges. In circumstances where an extreme need for high $P_{LINE}$ is expected, for instance, in response to a large change in accelerator pedal position indicating a need to immediately fill a clutch and supply maximum clamping force in the clutch, $P_{DESIRED}$ can be set to $P_{MAX}$ or simply be commanded to a maximum value. Many factors are contemplated that can impact a selection of $P_{DESIRED}$, and the disclosure is not intended to be limited to the particular embodiments described herein. If no factors or motivations suggest that $P_{DESIRED}$ be set at an elevated level, $P_{DESIRED}$ can be set to a maximum $P_{MIN}$ according to current conditions in order to reduce power demands of the hydraulic pumps to the lowest possible level.

$P_{DESIRED}$ can be utilized to describe operating requirements of the hydraulic control system; however, physical limits and operational concerns can impact selection of a $P_{LINE}$ to be commanded. For example, $P_{MAX}$ can be described by $P_{AVAIL}$ or the maximum $P_{LINE}$ that can be achieved by the hydraulic control system under current operation conditions. Regardless of $P_{DESIRED}$, $P_{LINE}$ cannot exceed $P_{MAX}$. Additionally, $P_{MINSYSTEM}$ can be described as a minimum pressure required of the hydraulic control system under any circumstances, for example, to meet unexpected demands of the hydraulic control system with an acceptable response time. $P_{DESIRED}$, after comparison and adjustment to limits upon the hydraulic control system, can be modified to a $P_{REQUEST}$ for use in controlling pump operation.

Figure 5:
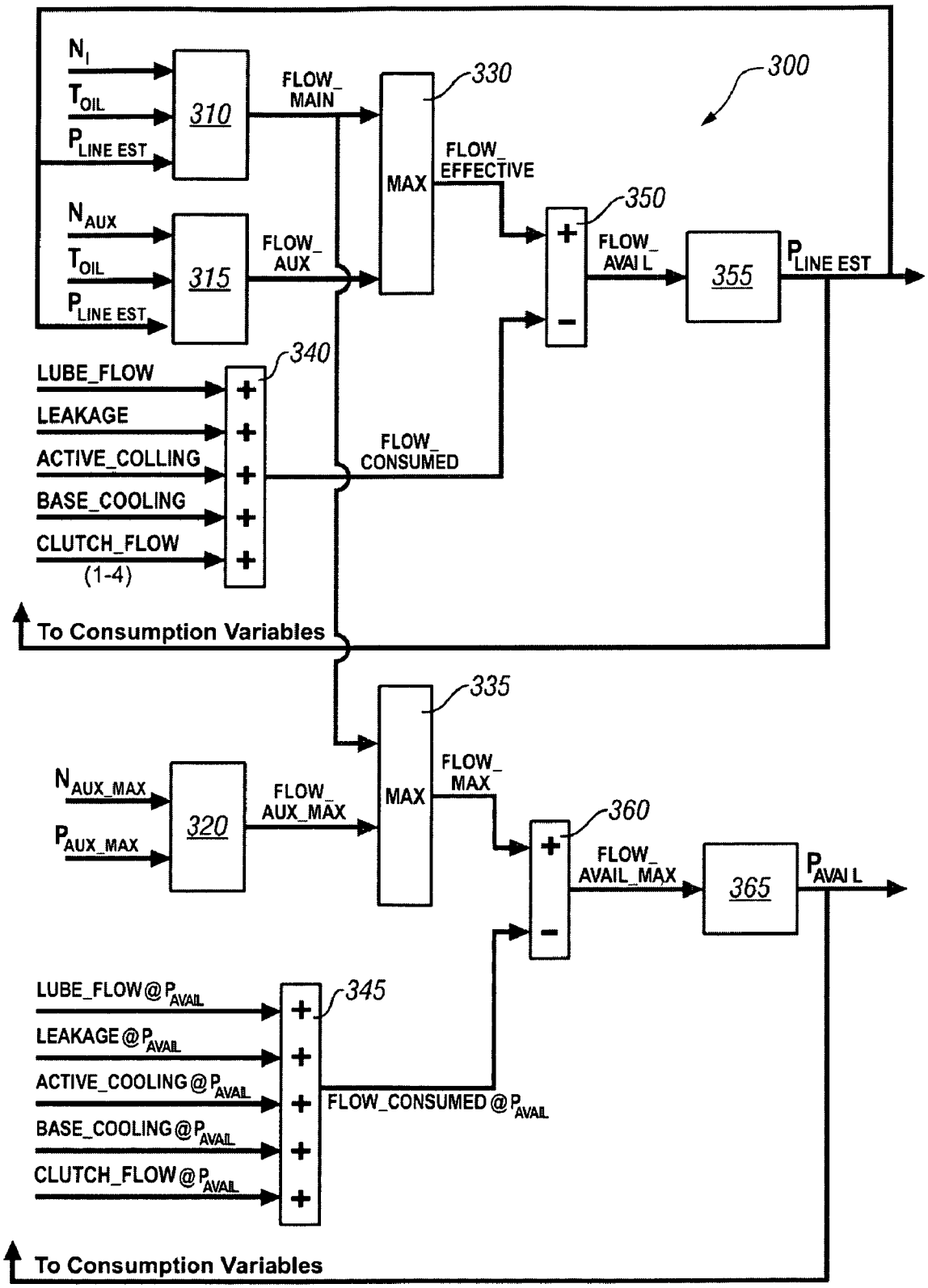
FIG. 5 depicts an exemplary flow of information effective to calculate an estimated current line pressure and a maximum available line pressure, in accordance with the present disclosure.

As described above, determination of $P_{LINEEST}$ and $P_{AVAIL}$ are important to understanding operation and capability of the hydraulic control system. FIG. 5 depicts an exemplary flow of information effective to calculate $P_{LINEEST}$ and $P_{AVAIL}$, in accordance with the present disclosure. Process 300 includes a determination of flows into and out of the hydraulic control system in order to estimate both $P_{LINEEST}$, an estimate of current line pressure, and $P_{AVAIL}$, an estimate of line pressure that could be achieved under current operating conditions. Process 300 comprises summation block 350 describing FLOW_AVAIL or the current balance of flows within the hydraulic control system; integration module 355 integrating the FLOW_AVAIL signal in order to sum the overall effects of flow on $P_{LINE}$ through a period of time and provide $P_{LINEEST}$; summation block 360 describing FLOW_AVAIL_MAX or the possible balance of flows within the hydraulic control system if the system were operated at a maximum pressure; and integration module 365 integrating the FLOW_AVAIL_MAX signal in order to sum the overall effects of flow on $P_{LINE}$ through a period of time and provide $P_{AVAIL}$. By tracking the effects of flow both according to current conditions and conditions possible at maximum settings, $P_{LINEEST}$ and $P_{AVAIL}$ can be determined for use in controlling the hydraulic control system.

A number of inputs are fed to summation block 350 in order to develop FLOW_AVAIL. FLOW_EFFECTIVE is an estimation of current hydraulic flow into the system. Flows in an exemplary system can originate from either a main hydraulic pump or an auxiliary hydraulic pump. In some systems, flow can originate from both pumps, and FLOW_EFFECTIVE could include a summation of a FLOW_MAIN from the main hydraulic pump and a FLOW_AUX from the auxiliary hydraulic pump. In the embodiment described in FIG. 5, flows from the two pumps are not summed, but rather the pump with the greater flow supplies the FLOW_EFFECTIVE. Physical embodiments of this configuration can include a check valve determining the greater flow and some means to cut off the source of the lesser flow. In FIG. 5, max block 330 is used to determine the greater of FLOW_MAIN and FLOW_AUX terms for use as FLOW_EFFECTIVE. FLOW_MAIN is determined in main pump flow block 310 from inputs including $N_{MAIN}$; $T_{OIL}$ describing the behavior of hydraulic oil as a result of temperature; and $P_{LINEEST}$ describing the effects of $P_{LINE}$ creating back pressure working against the pump. $N_{MAIN}$ can be described as depicted in FIG. 5 through $N_I$. FLOW_AUX is determined in aux pump flow block 315 from inputs including $N_{AUX}$, the speed of the auxiliary hydraulic pump; $T_{OIL}$; and $P_{LINEEST}$. FLOW_CONSUMED is an estimation of current hydraulic flow out of the hydraulic control system. FLOW_CONSUMED is determined at summation block 340, summing the flows from the functions served by the hydraulic control system. FIG. 5 includes exemplary functions described comprising a lube flow; a leakage flow; an active electric machine cooling flow; a base electric machine cooling flow; and flows serving transmission clutches. FLOW_EFFECTIVE and FLOW_CONSUMED are summed at block 350, and the net flow in the hydraulic control system is output as FLOW_AVAIL.

A number of inputs are fed to summation block 360 in order to develop FLOW_AVAIL_MAX. FLOW_MAX is an estimation of maximum hydraulic flow that could be delivered into the system under current operating conditions. As described above, flows in an exemplary system can originate from either a main hydraulic pump or an auxiliary hydraulic pump. In some systems, flow can originate from both pumps, and FLOW_MAX could include a summation of a FLOW_MAIN from the main hydraulic pump and a FLOW_AUX_MAX from the auxiliary hydraulic pump. It will be appreciated that while output of an electrically powered auxiliary hydraulic pump can be modulated to provide a maximum output, output from a directly driven main hydraulic pump is dependent upon $N_I$, and, therefore, does not have a maximum output equivalent. Although certain embodiments allow for both pumps to work together to supply a flow, the embodiment described in FIG. 5 depicts flows from the two pumps being compared in max block 335, with the greater flow supplies the FLOW_MAX. FLOW_AUX_MAX is determined in aux pump max flow block 320 from inputs including $N_{AUXMAX}$, the maximum achievable speed of auxiliary hydraulic pump; and $P_{AUXMAX}$, the maximum achievable pressure from the auxiliary hydraulic pump. FLOW_CONSUMED $P_{AVAIL}$ is determined at summation block 345, summing the flows from the functions served by the hydraulic control system, estimated if $P_{LINE}$ equaled $P_{AVAIL}$. As described above, different functions can be served by the hydraulic control system. The same five functions estimated for block 340 are estimated for block 345, with an assumption that each function is fed at $P_{AVAIL}$, and summed to determine FLOW_CONSUMED@$P_{AVAIL}$. FLOW_MAX and FLOW_CONSUMED@$P_{AVAIL}$ are summed at block 360, and the net flow in the hydraulic control system is output as FLOW_AVAIL_MAX.

Figure 6:
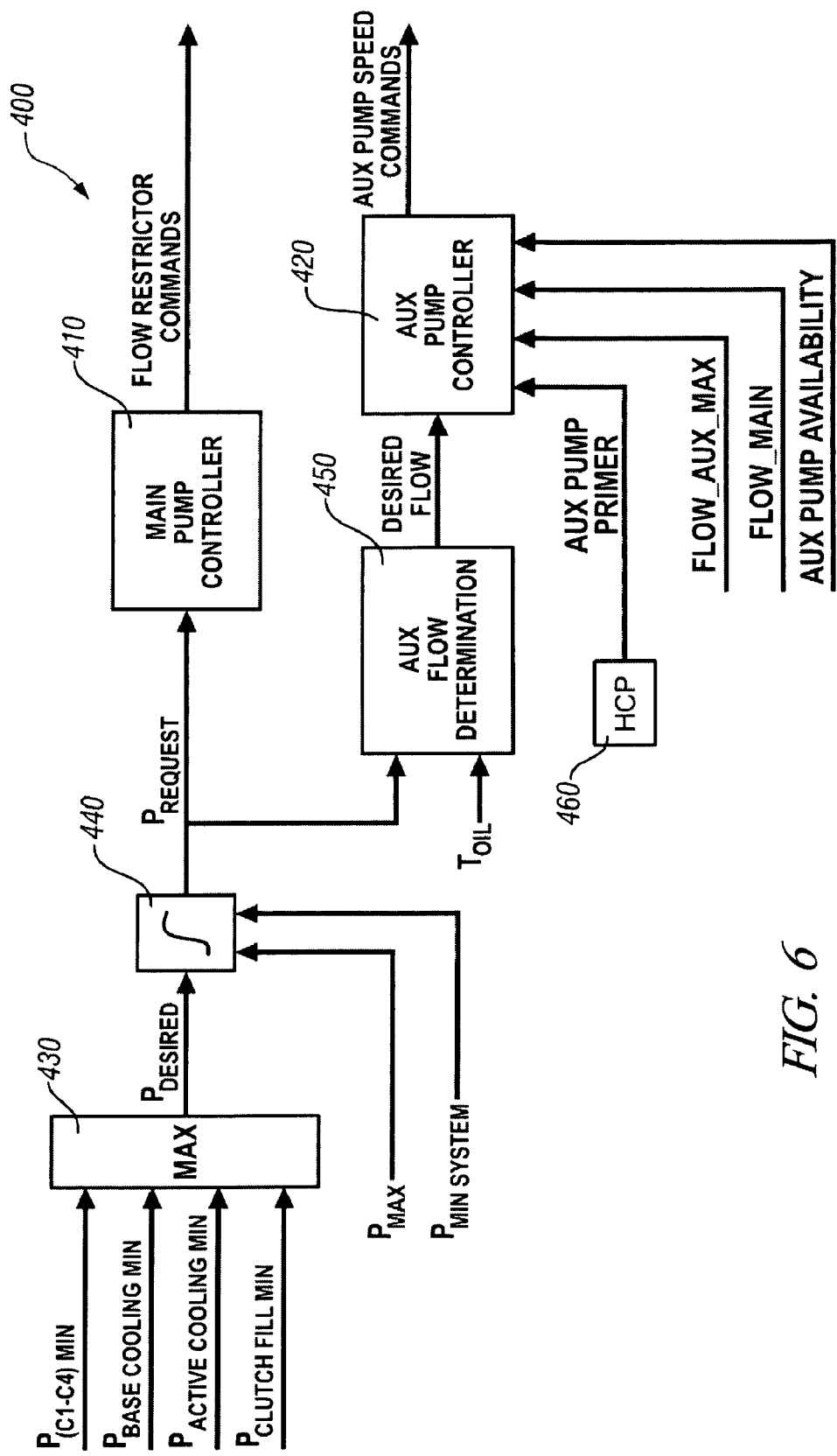
FIG. 6 depicts an exemplary flow of information utilizing modeling of the hydraulic control system to determine required hydraulic pump commands to meet requirements of functions served by the hydraulic control system, in accordance with the present disclosure.

As described above in association with FIGS. 1 and 5, an understanding and modeling of flows entering and exiting a hydraulic control system enables an estimation of system behavior under changing circumstances. FIG. 6 depicts an exemplary flow of information utilizing modeling of the hydraulic control system to determine required hydraulic pump commands to meet requirements of functions served by the hydraulic control system, in accordance with the present disclosure. Process 400 comprises max block 430 determining $P_{DESIRED}$ based upon $P_{MIN}$ terms describing minimum hydraulic flow requirements from functions served by the hydraulic control system; main pump controller 410; and aux pump controller 420. As described above, $P_{LINE}$ within the hydraulic control system is dependent upon a number of factors including pump operation and the various flows consumed by functions served by the hydraulic control system. Inputs to max block 430 include $P_{MIN}$ terms based upon calibrations, sensor readings, or algorithms based upon the individual functions served. $P_{MIN}$ terms can include various adjustments and scaling factors depending upon transient operation of the powertrain and any other information available required to predict upcoming demands upon the hydraulic control system. If these $P_{MIN}$ terms, block 430 selects the greatest of these terms and sets $P_{DESIRED}$ according to the selected $P_{MIN}$ term. $P_{DESIRED}$ is fed to block 440, wherein physical limits upon $P_{LINE}$ are imposed upon $P_{DESIRED}$, and $P_{REQUEST}$ is generated to command required line pressure. $P_{REQUEST}$ is fed to main pump controller 410, and changes are made to operation of the hydraulic control system and operation of the pump, such as changes to flow restrictor commands, based upon $P_{REQUEST}$. $P_{REQUEST}$ is also fed to aux flow determination module 450. Aux flow determination module 450 inputs $P_{REQUEST}$ and $T_{OIL}$, applies programming based upon flow modeling of the hydraulic control system as described above, and determines a DESIRED FLOW from the auxiliary hydraulic pump necessary to meet $P_{REQUEST}$. Programming of module 450 utilizes flows estimated to result from $P_{REQUEST}$. An exemplary depiction of such processing can be shown referring back to FIG. 5, block 345. Module 450 can similarly input LUBE_FLOW@$P_{REQUEST}$, LEAKAGE@$P_{REQUEST}$, and other required terms associated with functions served, utilize appropriate factors such as $T_{OIL}$, and determines the DESIRED FLOW from the auxiliary pump required to meet $P_{REQUEST}$. Aux pump controller 420 inputs the DESIRED FLOW, along with inputs including FLOW_AUX_MAX, FLOW_MAIN, and a measure of auxiliary pump availability, describing, for example, electrical power available to power the auxiliary hydraulic pump. Additionally, aux pump controller 420 can include an input from HCP 460 of an aux pump primer. As described above, engine control strategies can include engine stopped operation, wherein an engine can be stopped when not needed. When such a command is pending, an aux pump primer can be sent to aux pump controller 420 including an instruction to power up the auxiliary hydraulic pump to meet a pending shut down of the main hydraulic pump. In this way, extended periods of $P_{LINE}$ below requested levels associated with the auxiliary pump coming up to speed can be avoided. While FIG. 6 describes an exemplary flow of information accomplishing pump control based upon needs to functions served by the hydraulic control system, it will be appreciated that a number of embodiments are possible accomplishing such control based upon methods described herein, and the disclosure is not intended to be limited to the particular embodiments described herein.

Figure 7:
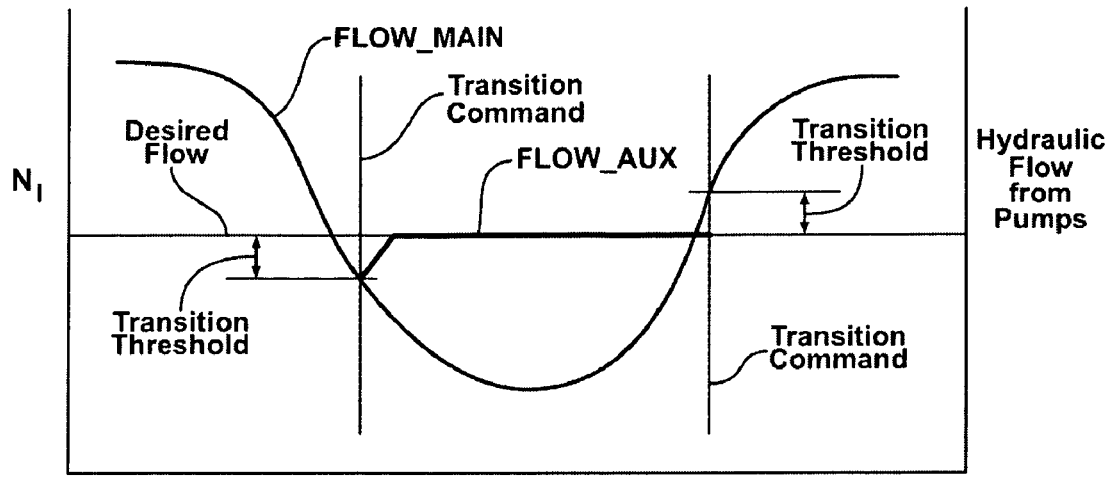
FIG. 7 graphically illustrates an exemplary hand-off event between pumps acting in the alternative, wherein hydraulic flow is maintained according to a desired flow through periods of changing engine speed, in accordance with the present disclosure.

As described above, a main hydraulic pump and an auxiliary hydraulic pump cooperate, either in tandem or in the alternative, to supply pressurized hydraulic oil to meet a demanded hydraulic line pressure. FIG. 7 graphically illustrates an exemplary hand-off event between pumps acting in the alternative, wherein hydraulic flow is maintained according to a desired flow through periods of changing engine speed, in accordance with the present disclosure. $N_I$ and hydraulic flow are depicted through a time span. $N_I$ is directly linked to speed of an exemplary main hydraulic pump directly driven by the engine, and, therefore, resulting hydraulic flow from operation of the main pump, or FLOW_MAIN, is substantially proportional to $N_I$. As $N_I$ drops, so does FLOW_MAIN, and FLOW_MAIN eventually falls below desired flow. A method is disclosed wherein a transition threshold is utilized, such that when FLOW_MAIN is detected below the desired flow by more than the threshold amount, a transition from the main hydraulic pump to the auxiliary hydraulic pump is commanded. Upon command, flow from the auxiliary pump, or FLOW_AUX, increases to maintain the desired flow. Hydraulic flow quickly recovers to the desired flow. The auxiliary pump continues to supply hydraulic flow until operation of the main pump supplies hydraulic flow in excess of FLOW_AUX. The transition from auxiliary pump operation to main pump operation can be handled in a number of ways. As described above, a check valve acting according to the difference in the flows can be utilized to select hydraulic flow to the hydraulic control system and can include a cut-off or leak path mechanism for the de-selected pump. Another method to transition from auxiliary pump operation to main pump operation is to continue to operate the auxiliary hydraulic pump despite main pump operation until FLOW_MAIN exceeds the desired flow by more than a transition threshold. It will be appreciated that use of transition thresholds such as the thresholds depicted in FIG. 7 avoid unnecessary transition events. For example, in a case where engine speed varies between the two transition levels and crosses the desired flow a number of times, transitions commanded without the transition thresholds, commanded by a simple comparison to desired flow, will create multiple auxiliary pump on and off commands. Even under operation of a check valve, where actual FLOW_MAIN values in excess of FLOW_AUX values will automatically cause the hydraulic flow to be driven by FLOW_MAIN, continuing operation of the auxiliary pump until a transition threshold is exceeded by FLOW_MAIN reduces wear upon the auxiliary pump and reduces variability in the resulting hydraulic flow if FLOW_MAIN drops again below the desired flow. It will be appreciated that the transition illustrated in FIG. 7 is considered ideal, wherein the auxiliary hydraulic pump is immediately available to restore hydraulic flow without any ramping up losses. Under actual conditions, if the auxiliary hydraulic pump is idle at the point of handoff, hydraulic flow continues to drop with $N_I$ until the auxiliary pump reaches a speed at which it is capable of producing more hydraulic flow than the main pump. Methods are disclosed herein for lessening the impact of transitions upon hydraulic flow.

Figure 8:
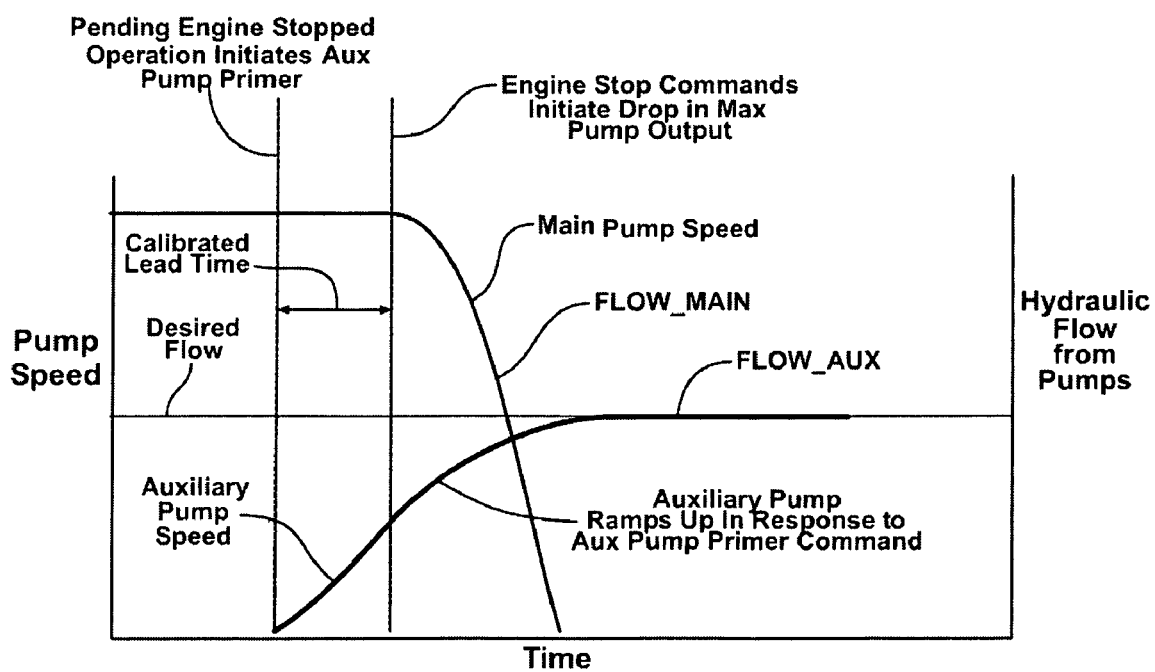
FIG. 8 graphically illustrates an exemplary method to reduce the impact of an auxiliary hydraulic pump coming up to speed during pump transitions, in accordance with the present disclosure.

FIG. 8 graphically illustrates an exemplary method to reduce the impact of an auxiliary hydraulic pump coming up to speed during pump transitions, in accordance with the present disclosure. Pump speed and hydraulic flow are depicted through a time span. Conditions illustrated at the left extreme of the graph depict an operating situation in which hydraulic flow is being supplied as a FLOW_MAIN from a directly driven main hydraulic pump. At some point, a command is initiated in the strategic control of the powertrain to stop the engine. Such a command can be initiated as part of a hybrid control strategy, wherein an electric machine or electric machines are going to be utilized to provide torque to the output, or such a command can be used in an idle or a coasting condition when engine input is not needed. As a result, it is known that hydraulic flow from the main pump is about to be reduced to zero. An aux pump primer command is initiated to preemptively bring the auxiliary pump up to speed in order to avoid the aforementioned lag time associated with an idled auxiliary pump. The exemplary aux pump primer command is issued a calibrated lead time before the expected initiation of the engine stop condition to the engine. The calibrated lead time can be set experimentally, empirically, predictively, through modeling or other techniques adequate to accurately predict engine and pump operation, and a multitude of calibration lead times might be used by the same hydraulic control system for different engine settings, conditions, or operating ranges. Because the aux pump primer command is issued before the main pump speed and associated FLOW_MAIN fall below the desired flow, the auxiliary pump has time to come up to speed and reduce any substantial transitory effects to hydraulic flow during the handoff.

FIG. 8 demonstrates a method to reduce transitory effects to hydraulic flow of an engine stop command. It will be appreciated that a similar technique can be used in anticipation of a predicted slowing of $N_I$ to levels that would not support a desired flow. For example, in a vehicular application, predictions regarding $N_I$ can be based upon real-time data or can be based upon road slope, road sensing devices, geographical or 3D map data. For example, if $N_I$ shows a steep decline which will cause FLOW_MAIN to fall below the desired flow in 1.5 seconds, an aux pump primer command can be immediately issued to bring the auxiliary pump up to speed. Road slope data, for example, an indication that the vehicle is on a steep downward incline, indicating that the engine speed is likely to be greatly reduced or stopped, can be utilized to predictively send an aux pump primer command. If engine operation can be predicted based upon radar systems, vision systems, vehicle-to-vehicle communication, or other means to determine predicted engine speeds, forecasted, for example, by stopped traffic, a traffic signal, or slowing traffic, appropriate aux pump primer commands can issued. Similarly, if location of the vehicle can be determined by a GPS device in association with a 3D map, geographic details, traffic patterns, weather reports, and other such information that could indicate a pending change in engine usage. Through whatever source, information regarding a predicted change to $N_I$ can be used to predictively issue aux pump primer commands to reduce transient effects of pump handoffs to hydraulic flow in a hydraulic control system.

While the above embodiments describe a system utilizing a main pump driven by the engine and an auxiliary pump electrically driven, one having ordinary skill in the art will appreciate that the methods described herein can be used with a wide variety of hydraulic control system configurations. For example, a single electrically powered pump can be used in place of the two pump embodiment described above, and equivalent determinations of $P_{MIN}$ for functions served could be used in combination with flow modeling to control such a configuration.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for controlling a hydraulic flow within a powertrain comprising an electromechanical transmission mechanically-operatively coupled to an engine adapted to selectively transmit power to an output, wherein said transmission utilizes a hydraulic control system serving a number of hydraulic oil consuming functions, said method comprising:
   monitoring minimum hydraulic pressure requirements for each of said functions;
   determining a requested hydraulic pressure based upon said monitoring minimum hydraulic pressure requirements and physical limits of said hydraulic control system including a maximum pressure;
   determining a desired flow utilizing a hydraulic control system flow model based upon said requested hydraulic pressure; and
   utilizing said desired flow to control an auxiliary hydraulic pump.

2. The method of claim 1, wherein determining said requested hydraulic pressure based upon said monitoring minimum hydraulic pressure requirements and said physical limits of said hydraulic control system comprises:
   selecting a desired hydraulic pressure from a maximum of said minimum hydraulic pressure requirements; and
   utilizing said desired hydraulic pressure as said requested hydraulic pressure unless said desired hydraulic pressure is outside said physical limits.

3. The method of claim 1, further comprising:
   monitoring a speed of said engine;
   determining a main hydraulic flow of a directly driven main hydraulic pump based upon said speed of said engine;
   predicting said main hydraulic flow decreasing below said desired flow by more than a transition threshold; and
   commanding an auxiliary hydraulic pump primer based upon said predicting.

4. The method of claim 3, wherein predicting said main hydraulic flow falling below said desired flow by more than said transition threshold is based upon a pending engine stop event.

5. The method of claim 4, wherein commanding an auxiliary hydraulic pump primer is initiated a calibrated lead time before initiation of said pending stop engine event.

6. The method of claim 4,
   wherein said transmission is further mechanically-operatively coupled to an electric machine, and
   wherein said pending engine stop event is part of a hybrid control strategy.

7. The method of claim 4,
   wherein said transmission is further mechanically-operatively coupled to a plurality of electric machines, and
   wherein said pending engine stop event is part of a hybrid control strategy.

8. The method of claim 3,
   wherein said powertrain is in a motor vehicle, and
   wherein said predicting said main hydraulic flow falling below said desired flow by more than said transition threshold is based upon a road sensing device monitoring conditions in front of the vehicle.

9. The method of claim 3, wherein said predicting said main hydraulic flow falling below said desired flow by more than said transition threshold is based upon data from a 3D map device.

10. The method of claim 1, further comprising:
    monitoring a speed of said engine; and
    determining a main hydraulic flow of a directly driven main hydraulic pump based upon said speed of said engine;
    wherein said utilizing said desired flow to control said auxiliary hydraulic pump comprises, when said main hydraulic flow decreases below said desired flow by more than a transition threshold, commanding said desired flow from said auxiliary hydraulic pump.

11. The method of claim 10, wherein commanding said desired flow from said auxiliary hydraulic pump includes when said main hydraulic flow increases more than a second transition threshold above said desired flow, commanding said auxiliary hydraulic pump to stop.

12. The method of claim 1, wherein monitoring said minimum hydraulic pressure requirements comprises:
monitoring operation of hydraulically actuated clutches within said transmission;
monitoring operation of an active electric machine cooling circuit;
monitoring requirements of a base cooling electric machine cooling circuit; and
monitoring requirements of a lubrication circuit.

13. The method of claim 1, further comprising monitoring an auxiliary hydraulic pump availability, wherein said utilizing said desired flow to control said auxiliary hydraulic pump includes modulating said control based upon said auxiliary hydraulic pump availability.

14. Apparatus for controlling a hydraulic flow within a powertrain comprising an electromechanical transmission mechanically-operatively coupled to an engine adapted to selectively transmit power to an output, wherein said transmission utilizes a hydraulic control system serving a number of hydraulic oil consuming functions, said apparatus comprising:
an auxiliary hydraulic pump in fluid communication with said hydraulic control system;
an auxiliary flow determination module, including logic to
monitor a requested pressure determined based upon minimum pressure requirements of said hydraulic oil consuming functions and physical limits of said hydraulic control system, and
determine a desired flow based upon said requested pressure and known behavior of said hydraulic control system; and
an auxiliary pump controller in signal communication with said auxiliary flow determination module and issuing command signals to said auxiliary hydraulic pump, including logic to
monitor said desired flow,
monitor a main flow from a main hydraulic pump, and
issue commands to said auxiliary hydraulic pump based upon said desired flow and said main flow.

15. The apparatus or claim 14, wherein said auxiliary pump controller further includes logic to:
monitor an estimated maximum hydraulic flow that said auxiliary hydraulic pump is capable of providing; and
monitor an auxiliary pump availability;
wherein said logic to issue commands to said auxiliary hydraulic pump is further based upon said estimated maximum hydraulic flow and said auxiliary pump availability.

16. The apparatus of claim 14, wherein said auxiliary pump controller further includes logic to monitor an auxiliary pump primer signal including instructions to command said auxiliary hydraulic pump to an operational speed based upon a pending engine stop event.

17. The apparatus of claim 14,
wherein said auxiliary pump controller further includes logic to determine if said main flow is below said desired flow by more than a transition threshold, and
wherein said logic to issue commands to said auxiliary hydraulic pump is based upon said determination.

* * * * *